(12) United States Patent
Vu et al.

(10) Patent No.: US 10,092,861 B2
(45) Date of Patent: Oct. 9, 2018

(54) SEPARATION METHOD FOR IMMISCIBLE FLUIDS

(71) Applicant: Ansor Gabler, Konstanz (GE)

(72) Inventors: Van-Khoi Vu, Paris (FR); Ansor Gabler, Konstanz (GE)

(73) Assignee: SULZER CHEMTECH AG, Winterhur (CH)

( * ) Notice: Subject to any disclaimer, the term of this patent is extended or adjusted under 35 U.S.C. 154(b) by 0 days.

(21) Appl. No.: 14/294,542

(22) Filed: Jun. 3, 2014

(65) Prior Publication Data

US 2014/0284285 A1  Sep. 25, 2014

Related U.S. Application Data

(62) Division of application No. 12/998,435, filed as application No. PCT/EP2009/063498 on Oct. 15, 2009, now abandoned.

(30) Foreign Application Priority Data

Nov. 7, 2008  (EP) .................................... 08168628

(51) Int. Cl.

| B01D 17/02 | (2006.01) |
|---|---|
| B01D 17/04 | (2006.01) |
| B01D 19/00 | (2006.01) |
| C10G 33/06 | (2006.01) |

(52) U.S. Cl.
CPC ......... B01D 17/0214 (2013.01); B01D 17/02 (2013.01); B01D 17/045 (2013.01); B01D 19/0042 (2013.01); B01D 19/0047 (2013.01); C10G 33/06 (2013.01); *C10G 2300/208* (2013.01); *C10G 2300/4081* (2013.01); *C10G 2300/805* (2013.01)

(58) Field of Classification Search
CPC ...................................................... B01D 17/02
See application file for complete search history.

(56) References Cited

U.S. PATENT DOCUMENTS

| 4,426,293 A * | 1/1984 | Mason ............... B01D 17/0208 |
| | | 210/104 |
| 5,368,747 A * | 11/1994 | Rymal, Jr. ............. B01D 17/02 |
| | | 210/137 |

FOREIGN PATENT DOCUMENTS

| GB | 1368522 | * 10/1972 | ............. B01D 17/02 |
| JP | 60-232213 | 11/1985 | |
| SU | 702068 A | 12/1979 | |

(Continued)

*Primary Examiner* — Peter Keyworth
(74) *Attorney, Agent, or Firm* — Francias C. Hand; Carella, Bryne, et al

(57) ABSTRACT

A wash separator comprises a vessel containing a first fluid and a second fluid whereby the second fluid has a different density from the first fluid. The first fluid (3) is immiscible with the second fluid and the first and second fluids are separated from each other by an interface. A feed stream comprising a dispersion of the first and second fluid wherein the second fluid forms a disperse phase in the form of droplets is distributed within the first fluid in the vessel forming a continuous phase. A distribution element is provided in the vessel to distribute the feed stream into the second fluid. The feed stream after having been discharged from the distribution element has a retention time of at most 15 minutes in the feed second fluid in the vessel.

4 Claims, 6 Drawing Sheets

(56) References Cited

FOREIGN PATENT DOCUMENTS

WO 92/19348 A1 11/1992
WO WO 2005/905776 1/2006

\* cited by examiner

SEPARATION METHOD FOR IMMISCIBLE FLUIDS

This is a Division of U.S. Ser. No. 11/998,435, filed Aug. 30, 2011 which is based on International Patent Application PCT/EP2009/063498 filed Oct. 15, 2009.

The invention relates to a method for separation of a first and a second immiscible fluid, in particular of a water and oil dispersion into a water phase and an oil phase and a wash separator for performing such separation.

A conventional three phase separator operates as follows: usually a water in oil dispersion is fed into the separator. Such a water in oil dispersion may be a well fluid obtained from an oil well. The water in oil dispersion may additionally contain a gas, which is mainly degassed from the oil phase.

The conventional three phase separator consists of 3 sections, a first section containing the water (and gas) in oil dispersion, a second section in which the water and oil are separated and a third section, which contains the oil. The first section is used for storing a certain feed volume and it works as a flow homogenizer and inlet section. In the second section a separation by settling takes place. The third section is a storage section for the oil which may work also as a flow homogenizer. A settling is performed in any of the first, second and third sections. Due to the fact that the settling step requires up to a couple of hours to be completed, the required volumes for the first, second and the third sections are considerable. Such a conventional three phase separator can be employed and operated satisfactorily under conditions where the separator size is not limited.

However the conventional three phase separator has due to its sheer size several limitations, for instance when using it for a separation of an water in oil dispersion in a subsea oil production environment. For such an application the size of the separator has to be reduced in order to meet the requirements imposed on any equipment for separation to be operated under high pressure.

Due to the fact that the settling step involves a separation by gravity, the retention time of the dispersion in the settling section is high. Three hours and more are common values for the retention time. If a high separation efficiency is needed, the retention time of a couple of hours is needed for separating small secondary water droplets present in the oil phase. This can be e.g. the case if a heavy oil water mixture has to be separated.

There is a need for a separator, which can be used under subsea conditions. A separator for such a high pressure condition has to be small in size.

It is an object of the invention to provide a separator which is suitable for operation under subsea conditions.

The object of the invention is solved by a wash separator comprising a vessel containing a first fluid and a second fluid whereby the second fluid has a different density from the first fluid, whereby the first fluid is immiscible with the second fluid and the first and second fluids are separated from each other by an interface, wherein a feed stream is provided, the feed stream comprising a dispersion of the first and second fluid, wherein the second fluid forming a disperse phase in the form of droplets is distributed within the first fluid forming a continuous phase, characterised in that a distribution element is provided in the vessel to distribute the feed stream into the second fluid, wherein the feed stream after having discharged from the distribution element has a retention time of at most 15 minutes in the second fluid in the vessel.

In a preferred embodiment, the retention time in the second fluid in the vessel is at most 10 minutes, preferably at most 5 minutes.

The feed stream can comprise a first feed stream and a second feed stream. A supply element can be foreseen for adding a make up stream of second fluid to the first feed stream.

The portion of the second fluid forming the dispersed phase in the feed stream is up to 90 volume % preferably up to 60 volume %, particularly preferred up to 45 volume % within the distribution element, whereby up to 60 volume % of the second fluid result from line 17 and or make up stream 16.

A mixing element, in particular a static mixer, can be arranged upstream of the distribution element. A mixing element may also be arranged in the stream of first fluid which is discharged from the wash separator.

A line for recycling the second fluid from the vessel into the first feed stream can be foreseen.

The vessel has a bottom. Close to the bottom the distribution element is arranged. The distribution element has at least one outlet opening for distributing the first fluid, containing the second fluid as disperse phase. According to the invention, the distance between the interface and the outlet opening of the distribution element depends on droplet size and the viscosity of the first fluid and the density difference of the first and second fluid. The distance between the interface and the outlet opening of the distribution element is at most 10 m, preferably at most 5 m, particularly preferred at most 3 m.

The feed stream can comprise a gas and/or a solid phase and the solid phase is separable by a solid retention element arranged below the interface.

An element for promoting coalescence can be arranged between the outlet opening of the distribution element and the interface and/or above the interface and/or the interface is within the element.

The first fluid can be an oil and the second fluid can be water.

A method for the separation of a first and a second immiscible fluid to be performed in a wash separator according to any of the embodiments comprises the step of feeding the feed stream comprising the first and second fluids into a vessel and distributing the feed stream by a distribution element into the second fluid.

For performing the method the feed stream can comprise a first feed stream and a second feed stream. The method can further comprise the step of adding second fluid to the first feed stream before the second feed stream leaves the distribution element.

The wash separator is advantageously operated at a pressure of less than the pressure at the critical point or under ambient pressure or under a pressure below ambient pressure or at least at ambient pressure and at most at a pressure below the pressure at the critical point.

The wash separator is preferably used for a sub-sea installation.

An oil is obtainable by a method as described above as an intermediate product of at most 10 volume % BSW preferably of at most 5 volume particularly preferred of at most 1 volume %, most preferred of at most 0.5 volume %, in particular under subsea conditions, at a pressure of at least 1 bar and up to and including its critical pressure, preferably at a pressure of 10 to 150 bar, particularly preferable at a pressure of 40 to 120 bar.

Experiments and field data have shown, that with a water leg below 3 m a BSW of less than 0.5 volume % was achieved.

Figure 1:
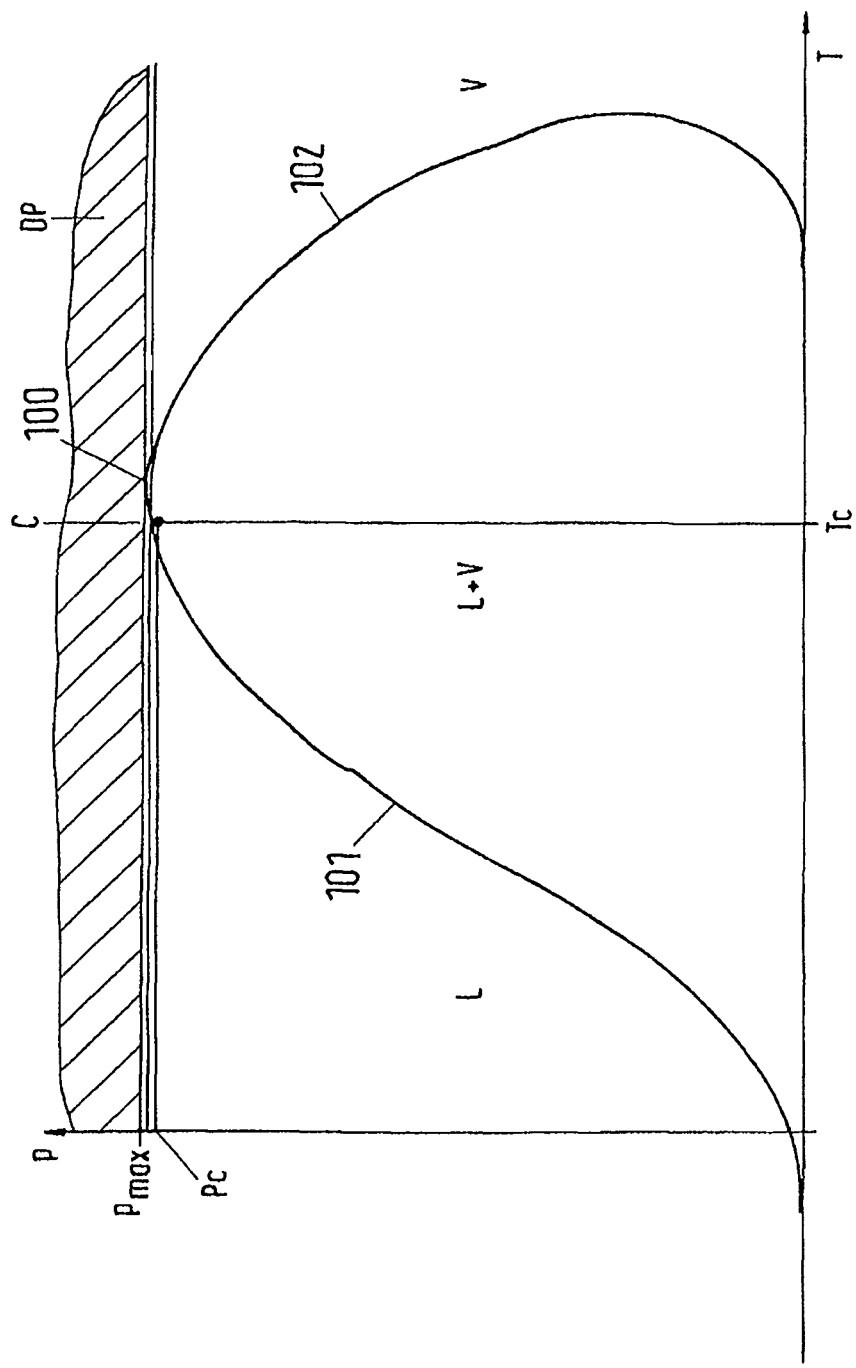
Figure 2:
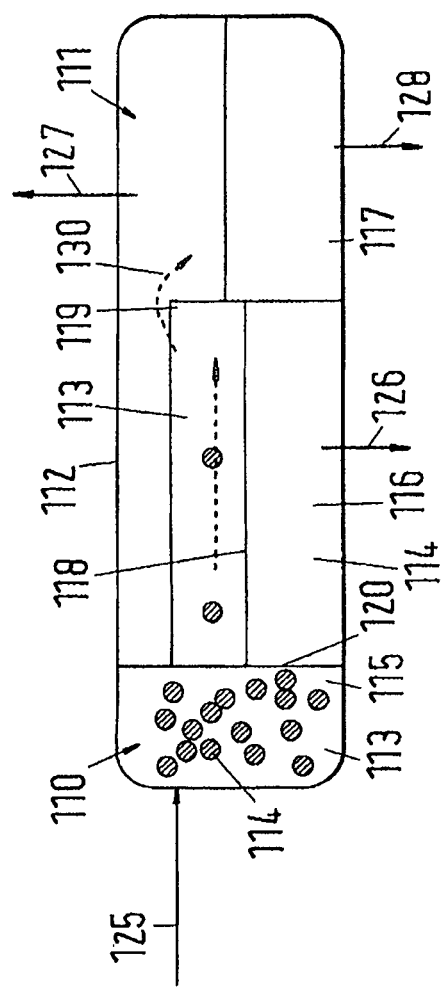

The invention will be explained in the following with reference to the drawings. There are shown:

FIG. 1 a phase diagram for an oil;

FIG. 2 a conventional three phase separator

Figure 3:
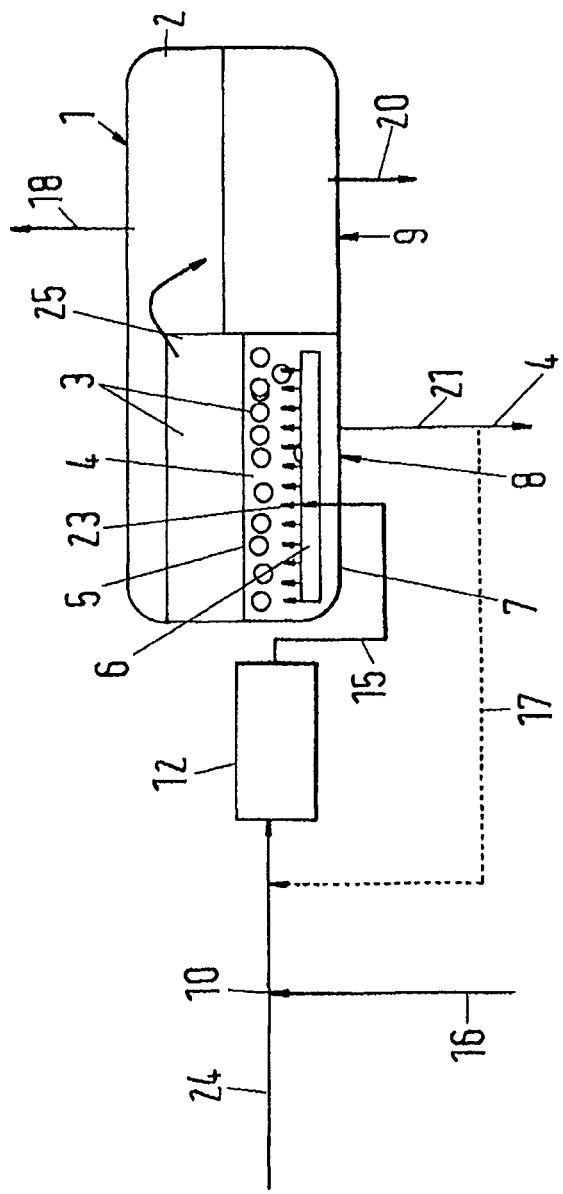

FIG. 3 a wash separator according to a first embodiment of this invention

Figure 4:
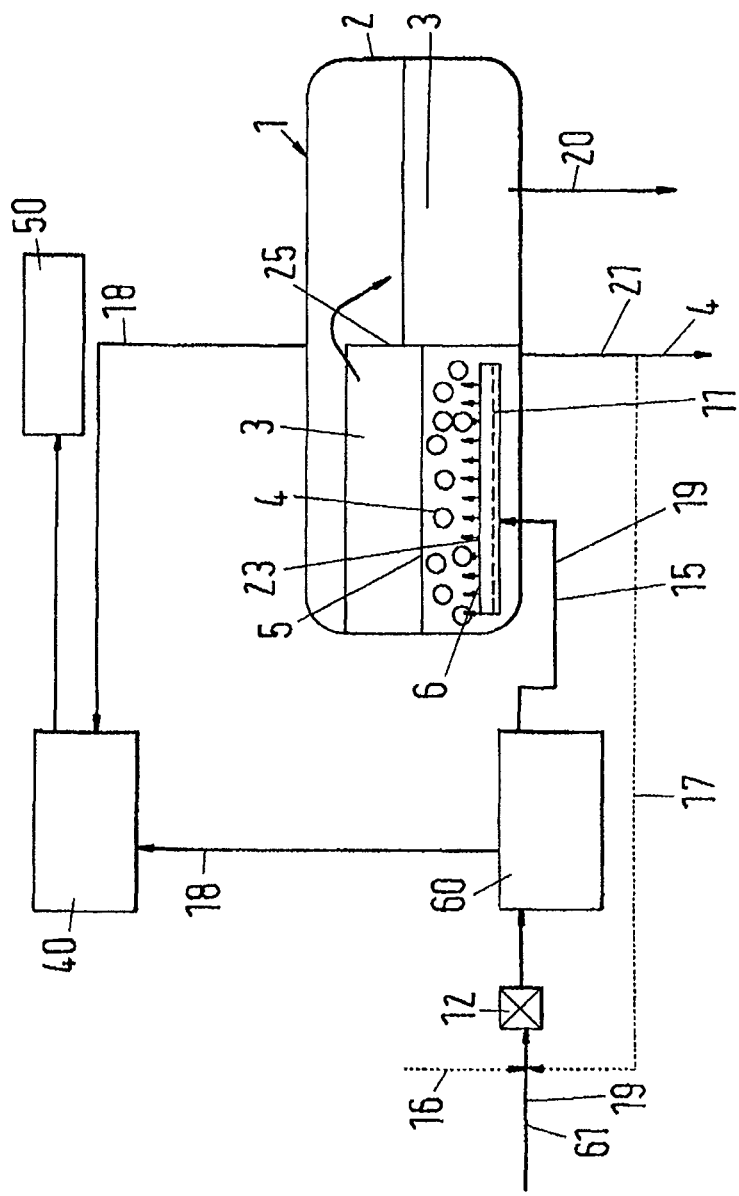

FIG. 4 a wash separator according to a second embodiment of this invention

Figure 5:
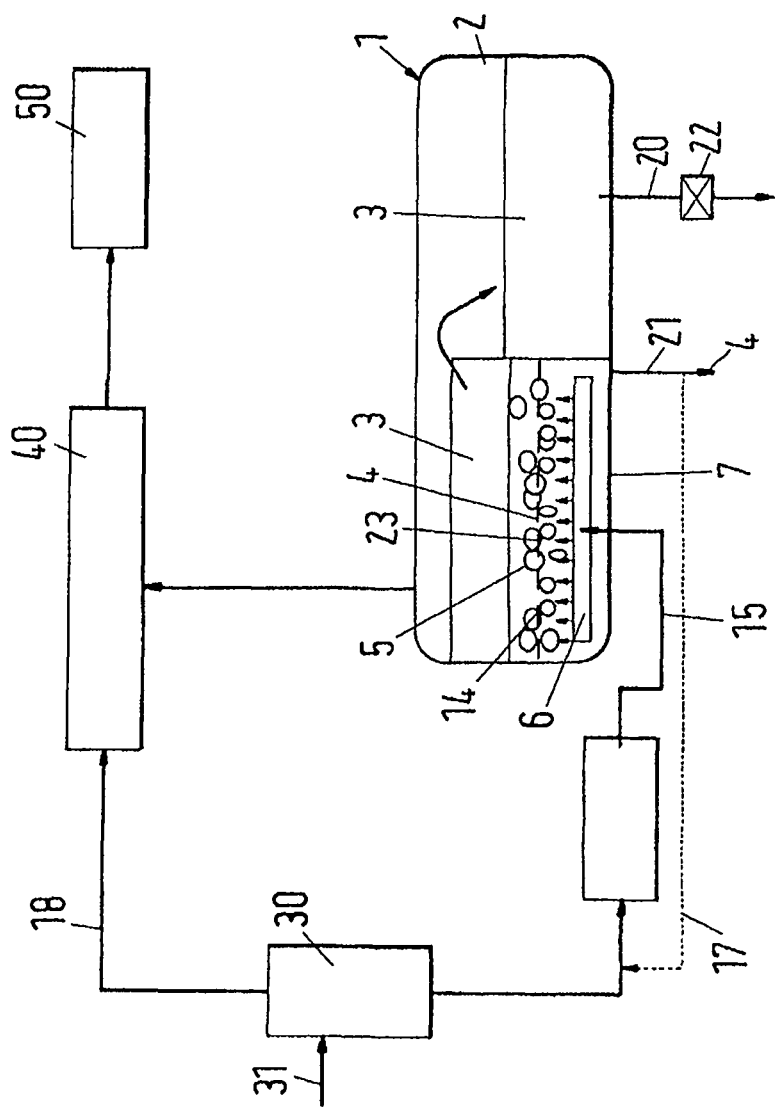

FIG. 5 a wash separator according to a third embodiment of this invention

Figure 6:
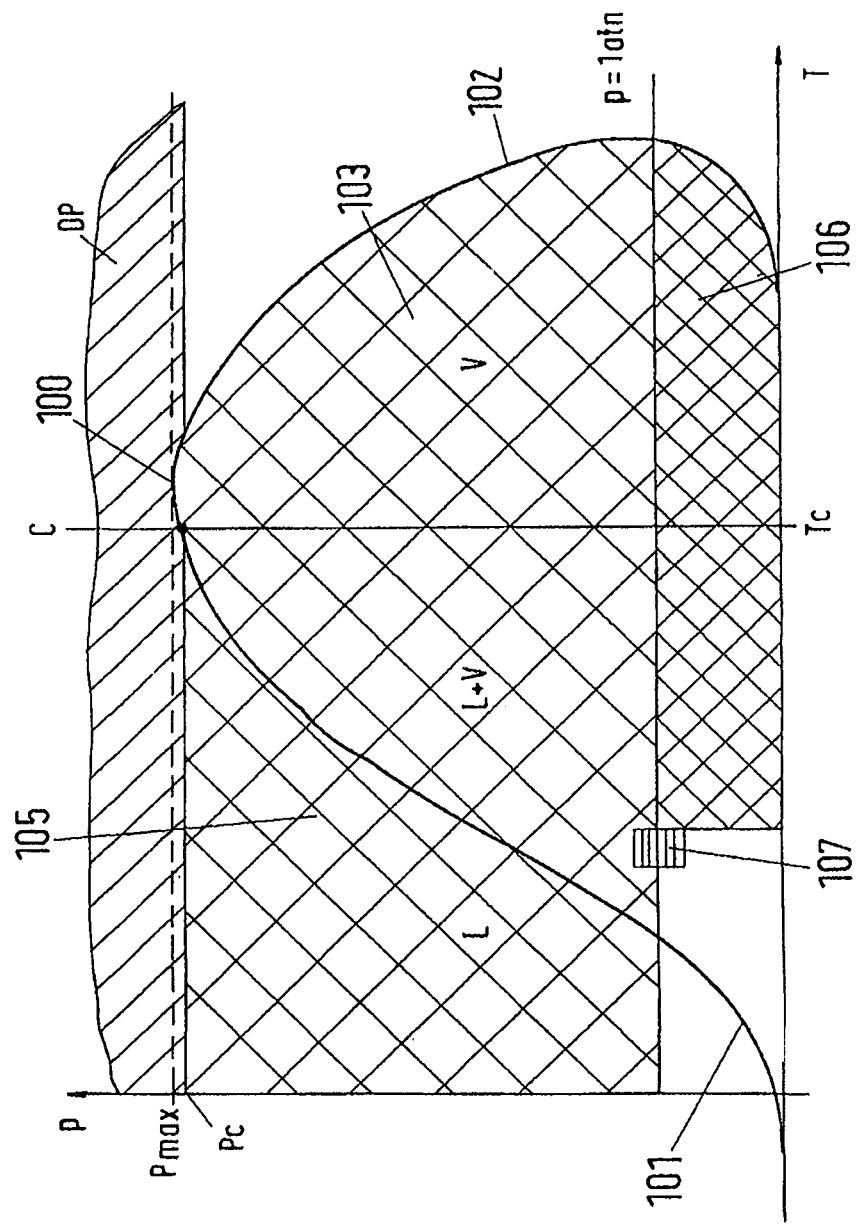

FIG. 6 the phase diagram of FIG. 1 including the operating range for the wash separator FIG. 1 shows a phase diagram for an oil such as a well fluid indicating which phases are stable under certain pressure and temperature conditions. On the horizontal or x-axis of the diagram, the temperature T is indicated. On the vertical or y-axis, the pressure p is indicated.

Thereby C indicates the critical point having the critical pressure Pc and the critical temperature Tc. The point of maximal pressure is often referred to as the cricondenbar point 100. The cricondenbar point not necessarily corresponds to the critical point C. The curve extending on the left side of the critical point is the liquid saturation curve 101. The other part of the curve, i.e. the curve extending on the right side of the critical point is the vapor saturation curve 102.

The areas of stability for the different phases are as follows: The area of stability of the liquid phase is indicated by letter L and extends in FIG. 1 above the liquid saturation curve 101 indicating the transition from liquid phase to a two phase region V+L, in which liquid and vapor phases of the oil coexist. The transition temperature to the dense phase, which is the region of supercritical fluid, which is present above the temperature of the critical point, represents the upper boundary of the area of stability of the liquid phase L.

Above the temperature at the critical point, only dense phase is present. The vapor phase V is present in a area according to FIG. 1 which extends to the right of the vapor saturation curve, that means the transition from the two phase region. The area V is extending up to the line indicating the temperature corresponding to the critical point.

Thus in FIG. 1, L+V indicates the two phase area in which liquid and vapor are present at the same time.

A conventional three phase separator 110 according to FIG. 2 operates as follows: a water in oil dispersion is fed into the separator. Such a water in oil dispersion may be a well fluid obtained from an oil well. The water in oil dispersion may in such a case additionally contain a gas, which is dissolved primarily in the oil phase. The oil phase 113 in this water in oil dispersion is thus the continuous phase whereas the water phase 114 is present in droplets in the first section 115 of the tank 112.

The conventional three phase separator 110 according to this FIG. 2 consists of 3 sections, a first section 115 containing the water (and gas) in oil dispersion, a second section 116 in which the dispersion is separated into two phases and a third section 117, which contains the oil. The first section 115 is used for storing a certain feed stream 125 and it works as a flow homogenizer and inlet section. In the second section 116 a separation by settling takes place. The third section 117 is a storage section for the oil which may work also as a flow homogenizer. A settling can be performed in any of the first, second and third sections (115, 116,117). Due to the fact that the settling step requires up to a couple of hours to be completed, the required volumes for the first, second and the third sections (115,116,117) are considerable. Such a conventional three phase separator can be employed and operated satisfactorily under conditions where the separator size is not limited. The first section 115 can be separated from the second section by a perforated plate 120. The dispersion moves across the perforated plate 120.

During the movement of the dispersion from the first section to the second section and thereafter to the third section a separation of the dispersion into the two phases by gravity in a settling step is performed. Water droplets present in the oil phase descend and oil droplets present in the water phase slowly rise to the interface 118. When the respective droplets arrive at the interface, they merge with the corresponding continuous phase, thus the oil droplets are received by and merge with the oil phase 113 whereas the water droplets are received by and merge with the water phase 114.

The oil phase 113 traverses the second section 114 and is fed via an overflow weir 119 into the third section 117. The uppermost layer of oil is decanted, that means it spills over the weir 119 and is collected in a basin forming the third section. The water phase accumulates in the bottom part of the tank in the second section and is discharged from the tank as residue 126.

The third section 117 is a storage section for the oil which may work also as an accumulator from which oil can be fed as oil discharge 128 continuously into a subsequent process unit. The third section thus ensures, that oil is available for subsequent continuous process steps.

The separation of any gas from the oil phase, thus a degassing step, takes place mainly in the second and third sections. The gas phase is discharged from the top of tank 112 by a gas discharge stream 127.

The progressive movement of the oil phase from the second to the third sections is indicated by the arrows 130 in dotted lines. When moving slowly through the second section, the water drops contained in the oil descend by virtue of gravity, so that the uppermost layer of the water in oil dispersion is depleted of water, when reaching the weir 119 delimiting the second section 116 on its right side as shown in FIG. 2.

If the drop sizes of the water in the oil are very small and/or the density difference between oil and water is small, the settling operations may well take several hours. Settling times of 24 hours are not unusual for such conventional three phase separators. Stokes law explains the relation between drop size and velocity of droplet sedimentation, which will be explained in more detail. From Stokes law it results that small drops result in a substantial decrease of speed of sedimentation, thus increasing the settling or retention time required.

A separator, which has to be designed for such a long settling (or retention) time is consequently of a large size, for many applications, such as oil platforms too bulky in size.

The wash separator of this invention according to FIG. 3, FIG. 4, FIG. 5 as compared to the conventional three phase separator according to FIG. 2 requires retention times of some minutes only. Due to these short retention times, it has become possible that the wash separator is considerably reduced in size. A first section needed for a conventional three phase separator according to FIG. 2 can be completely be dispensed with in any of FIGS. 3 to 5.

The wash separator 1 comprises a vessel 2 containing a first fluid 3 and a second fluid 4 whereby the second fluid 4 has a different density from the first fluid 3. The first fluid 3 is immiscible with the second fluid 4 and the first and second fluids are separated from each other by an interface 5. A feed stream 15 is provided, the feed stream 15 comprising a dispersion of the first and second fluid (3,4). The second fluid 4 thus forms in the feed a disperse phase in the form of droplets which is distributed within the first fluid 3 forming a continuous phase. The feed stream 15 may enter continuously into the wash separator 1 through the distribution element 6. By means of the distribution element 6, which is provided in the vessel 2, the feed stream 15 is distributed into the second fluid 4. It is to be noted, that the phases are inverted with regard to the known separator after the dispersion has passed the distribution element. The second fluid 4 in the vessel is now predominantly the continuous phase, into which droplets containing the first fluid 3 are distributed. These droplets of the first fluid 3 may again contain small droplets of the second fluid 4.

Thus, the first fluid 3 is always the fluid of lower density, irrespective of the composition of phases, the second fluid the fluid of higher density. In particular, the first fluid can be oil and the second fluid can be water. In this particular case the feed stream 15 is a water in oil dispersion. Thus reference numeral 3 refers to the oil phase, and reference numeral 4 to the water phase. Thus the water may be produced water in the feed stream (24, 61, 31) of FIGS. 3, 4 and 5 respectively. The water may also be fresh water 16 e.g. sea water, or recycled water, such as the water in line 17.

Making use of such a phase inversion allows for a separation triggered by a completely different separation mechanism, by coalescence. This is the principal reason why the feed stream 15 after having discharged from said distribution element 6 has a retention time of at most 15 minutes in the second fluid in the vessel. Due to the fact that this invention can make use of coalescence, the retention time in the second fluid 4 in the vessel 2 is at most 10 minutes, preferably at most 5 minutes.

The design of a wash separator enabling such a coalescence results in an unexpected remarkable improvement of separation as compared to conventional gravitational separators based on settling.

It is assumed that the following mechanisms contribute to this unexpected result, which will be explained for the system oil/water. However the disclosure is not limited in any way to oil/water systems, it can be extended to any dispersion comprising a first and a second fluid. The oil droplets present in the water phase forming an oil in water dispersion or alternatively a water in oil in water dispersion, also named a multiple dispersion, in the wash separator are subjected to two different mechanisms expressed as scenario a) or scenario b):

If the oil droplets contain water droplets the water droplets according to scenario a) either coalesce in the oil droplet or according to scenario b) the water droplets migrate to the interface separating the oil droplet from the continuous water phase in the vessel and coalesce with the continuous water phase surrounding the oil droplet.

Under scenario a) the water droplets inside the oil droplet are moving because of the secondary flow field inside the oil droplets induced by movement of the oil droplets in the water leg. During their movement inside the oil droplet, they encounter other water droplets. When coming in contact with another water droplet, the two small water droplets tend to merge to a single, larger water droplet.

Under scenario b) the water droplets moving inside the oil droplet have a tendency to move towards the interface of the oil droplet with the continuous water phase surrounding the oil droplet. When such a water droplet reaches the interface, it merges with the continuous water phase surrounding the oil droplet. As a consequence the number of water droplets in the oil droplet decreases. Consequently the oil droplet is depleted of water droplets.

Experimentally it has been shown, that scenario b) appears to occur more often during the rising movement of the oil droplets within the water phase than scenario a).

Under both scenarios, the small water droplets inside the oil droplets either increase in size and/or decrease in their number. Therefore both scenarios contribute to improve the separation of oil and water.

The separation of oil and water takes place at the interface 5 of the water and oil phase in the wash separator. If an oil droplet according to scenario a) reaches the interface 5, the oil droplet merges with the oil phase 3 forming the upper part of the interface and the fluid layer above the interface. The water droplet inside the oil droplet is, due to its size, likely to migrate back into the lower part of the interface, that is into the water phase below the interface 5.

This migration back to the water phase should occur also according to the Stokes law, a model used for description of separation by gravitation.

Stokes law relates to the velocity of droplet sedimentation, that is in our case to the move of the water droplet of scenario a) downwards in the direction of the lower part of the interface.

According to Stokes law, the velocity of droplet sedimentation is proportional to the square of the droplet diameter. Therefore the increase in size of the droplet has a large impact on the velocity of droplet sedimentation.

Therefore it is likely that a large water droplet according to scenario a) will migrate into the direction of the lower part of the interface formed by the water phase and it is unlikely that the water droplet will be entrained with the oil droplet into the oil phase. Consequently when scenario a) occurs, then the separation of water and oil dispersion is improved.

Scenario b) already results in an improvement of separation, when the oil droplets are migrating through the water phase due to the fact that the small water droplets inside the oil droplet decrease continuously in their number.

Therefore the conclusion must be, that if either one of scenarios a) or scenarios b) occurs, the separation is improved, whereby both scenarios make use of the coalescence of droplets.

Moreover the existence of a multiple dispersion in the oil droplet has the additional advantage, that the distance between the small water droplets within the oil drop is much smaller as compared to the distance of the water droplets in the oil layer of the conventional three phase separator. Therefore these water droplets coalesce much more rapidly according to scenario a) or reach the oil/water interface much more quickly according to scenario b).

Therefore the design of a wash separator enabling such a coalescence results in an unexpected remarkable improvement of separation as compared to conventional gravitational separators based on settling.

The wash separator according to FIG. 3 has a first section 8, in which the separation of the first fluid 3 and the second fluid 4 is completed and a second section 9. The first fluid can be degassed, thus any gas phase present in the first section 8 or the second section 9 is drained. From the second section, the first fluid is discharged as product stream 20. The first fluid passes over a weir 25 from the first section into the second section. Any gas phase present in the first fluid is rising to the top of the vessel and is discharged as gas stream 18.

Advantageously a supply element 10 for adding a make up stream 16 of second fluid to the feed stream can be foreseen. Alternatively or in addition thereto a line 17 split from the stream 22 of second fluid 4 leaving the bottom 7 of the vessel 2 may be added to the feed stream 15 before the feed stream 15 enters the distribution element 6. Unexpectedly the volume of the vessel 2 needed for separation needs not to be increased, if the portion of second fluid in the feed stream is up to 90 volume %, preferably up to 60 volume %, particularly preferred up to 45 volume % within the distribution element, thus prior to the discharge from the distribution element 6, whereby up to 60 volume % of the second fluid result from line 17 and or make up stream 16.

By adding such a substantial amount of second fluid to the feed stream 15, it would normally be assumed that the retention time in the vessel 2 would be reduced, what would affect the separation efficiency negatively. Alternatively it would normally assumed that if the same separation efficiency is to be obtained, the volume of the vessel would have to be increased. Surprisingly it turned out that the addition of second fluid 4 to the feed stream 15 not only does not lead to any of these expected effects. Even without increasing the volume of the vessel of the wash separator, a more efficient separation is obtained, even though the retention time is reduced in this case. Thus it is possible to reduce the size of the wash separator compared to the separator according to FIG. 2 drastically, especially when second fluid is added to the feed stream 15. It has been found, that the separation in the wash separator 1 does not occur due to settling, but is predominantly based on coalescence. This implies that the separation is not limited by Stokes law and the settling velocity of the droplets or the retention time in the volume of the vessel, but on the coalescence time, which is very short compared to the settling time in particular for many crude oil systems. The coalescence of the droplets of second fluid inside the droplets of the first fluid under either scenario a) or scenario b) as previously described is responsible for the enhanced separation efficiency and the short retention times. The addition of second fluid, in particular the addition of water to a crude oil feed reduces the concentration of surface active agents and naphthenic acids present in the feed stream 15 which promotes coalescence significantly. Due to the fact that the formation of naphthenates is reduced, a blockage of the interface 5 is prevented.

The amount of added second fluid in the make up stream 16 and/or the line 17 can usually be decreased during the lifetime of the crude oil field since the amount of second fluid in the feed stream 24, 31, 61 is increasing without addition of second fluid by the make up stream 16 and/or the line 17. The portion of the second fluid in the feed stream 15 is up to 90 volume % preferably up to 60 volume %, particularly preferred up to 45 volume % within the distribution element, whereby up to 60 volume % of the second fluid result from line 17 and or make up stream 16.

The make up stream 16 and/or the line 17 can be mixed with the feed stream 24, 31, 61 before leaving the distribution element 6. A mixing element 12, in particular a static mixer, can be arranged for this purpose upstream of the distribution element 6.

The drop size of the droplets of the first fluid in the second fluid in the feed stream leaving the distribution element is determined by the one or more outlet openings of the distribution element. Such a distribution element may comprise a nozzle for creating droplets of an average size of less than 10 mm. Alternatively the distribution element comprises a plurality of outlet openings for forming droplets in the range of several millimeters, preferably having an average droplet size of 1 to 25 mm, particularly preferred 1 to 15 mm.

It further results from the improved separation, that the distance between the interface 5 and an outlet opening 23 of the distribution element 7 of the vessel 2 is at most 10 m, preferably at most 5 m, particularly preferred at most 3 m.

FIG. 4 shows a wash separator 1 according to a second embodiment of this invention with a vessel 2 of similar configuration as FIG. 3. Concerning the features of this wash separator 1 it is referred to the description of FIG. 3. In FIG. 4, a second wash separator 60 is shown upstream of the wash separator 1. In this particular embodiment the wash separator 1 is operated with a "low gas to liquid low BSW live crude" as feed stream 15 coming from the second wash separator 60 shown only schematically.

The term "low gas to liquid low BSW live crude" stands for a crude oil, such as produced from wells or issued from reservoirs, also known under the term of crudes or production crudes. Such a crude oil is characterised by the RVP or Reid Vapor Pressure to ensure that the crude oil is stable and to avoid any degassing during transport and storage. Furthermore the crude oil is characterised by the BSW (Basic Sediment and Water) value, which is the volume percentage of water and sediment, thus solid phase. This BSW value should be usually at most 0.5 volume % for meeting the export quality standards of the crude oil. A further characteristic value is the salinity, which has to be less than 100 mg/l equivalent to natrium chloride, in particular less than 60 mg/l for the crude oil to be suitable to be processed further in subsequent refining steps.

The second wash separator 60 is operated under atmospheric conditions. A degasification can be performed in addition to the separation in this second wash separator, which has the same features as the wash separator of FIG. 3 and operates as described in connection with the first embodiment as disclosed in FIG. 3. The feed stream 61 to the second wash separator is a dispersion of the first and second fluids, in particular a crude oil containing water, either a "two phase live crude" and water or a "liquid live crude and water" or a mixture of degassed "low gas to liquid low BSW live crude" and water. A "live crude" is thereby a crude oil containing a significant amount of solved gas phase, i.e. usually existing under pressure. The "two phase" relates to the region of the phase diagram of FIG. 1 or FIG. 6 in which a liquid and a vapor phase coexist, the L+V area. The term "liquid live crude" relates to a dispersion in the L area of the phase diagram. The term degassed "low gas to liquid low BSW live crude" can either refer to the feed stream 15 of FIG. 4 or FIG. 5 or feed stream 15 of FIG. 3 or a feed stream 15 according to FIG. 6.

This wash separator 1 operates for the above mentioned type of feed stream 15 with a pressure p in the range of atmospheric pressure and a temperature T in the range of 40 to 45.degree. C. The feed stream 15 "low gas to liquid low BSW live crude" is consisting of "pre-degassed crude oil" or "low gas-to-liquid ratio liquid live crude coming from the second separator 60 operating under higher pressure. The product resulting from the separation process performed in the wash separator 1 is in this case a product stream 20 of a stabilised oil. Such a stabilised oil complies with sales specifications in terms of RVP, BSW and salinity. The product drawn off from the wash separator 1 or the last of the wash separators if more than one wash separator is arranged in series to the second wash separator 60 is a stabilised crude oil complying with the aforementioned specifications for storage and transport.

Additionally the feed stream 61 can comprise a solid phase 19. The solid phase plasses the mixing element 12 and enters the vessel together with feed stream 15. The solid phase 19 can be separated by a solid retention element 11 arranged below the interface 5.

A third possible arrangement of a wash separator 1 in a plant for the treatment of a dispersion, in particular for the treatment of crude oil is shown in FIG. 5.

In FIG. 5 a degasser 30 is foreseen for performing the degasification upstream of the wash separator 1 The wash separator operates under pressure and has the same configuration as in FIG. 3.

In addition an element 14 for promoting coalescence can be provided between the outlet opening 23 of the distribution element 6 and the interface 5 according to any of the embodiments shown in FIG. 3, FIG. 4 or FIG. 5. Alternatively the distribution element may comprise a plurality of outlet openings 23. Such an element 14 for promoting coalescence may be for example configured as a structured packing, a woven or non-woven structure or a perforated plate.

A mixing element 22 may also be arranged in the stream of first fluid 20 discharged from the vessel 2 of wash separator 1 which can still contain a portion of the second fluid. The mixing element 22 provides a dispersion and homogenisation of the stream of first fluid 20 which still contains a portion of the second fluid and avoids the generation of agglomerates of the second fluid. Such agglomerates are likely to be formed if the second fluid is a slurry. Furthermore, the creation of hydrates present in the second fluid can be reduced due to the dispersion and homogenisation of the stream of first fluid 20 which still contains a portion of the second fluid.

FIG. 6 shows the range of possible operation for the wash separator according to any of the embodiments of the invention. The cross-hatched areas 103, 105, 106 including the horizontally hatched area 107 indicate possible operation points for the wash separator. Compared thereto, a conventional wash tank can only operate in the very narrow horizontally hatched area 107. A conventional wash tank is for instance disclosed in U.S. Pat. No. 2,947,380 or WO2005/100512. This large area of possible operation of the wash separator according to this invention is another surprising effect as the wash tanks according to the prior art could only be operated in the horizontally hatched area 107 of the phase diagram. The separation mechanism based on coalescence as described in connection with this invention is surprisingly applicable to liquid/liquid dispersions as well as gas/liquid dispersions which happen to fall into the L+V area 103 of FIG. 1 or FIG. 6.

A method for the separation of a first and a second immiscible fluid to be performed in a wash separator 1 according to any of the preceding embodiments comprises the step of feeding the feed stream 15 comprising the first and second fluids into a vessel 2 and distributing the feed stream 15 by a distribution element 6 into the second fluid 4. The method may additionally comprise the step of adding second fluid 4 to the feed stream 24, 31, 61 before the feed stream 15 leaves the distribution element 6.

The wash separator can be operated under a pressure of less than the pressure at the critical point or under ambient pressure or even at a pressure below ambient pressure. The wash separator can also be operated at least at ambient pressure and at most at a pressure below the pressure at the critical point. The feed stream comprises a liquid/liquid dispersion or alternatively a gas-liquid dispersion.

One of the most preferred uses of the wash separator according to any of the preceding embodiments is the separation of crude oil and water in a sub-sea installation.

What is claimed is:

1. A method for the separation of a first and a second immiscible fluid in a wash separator comprising a vessel containing the first fluid and the second fluid, whereby the second fluid has a different density from the first fluid, whereby the first fluid is immiscible with the second fluid and the first and second fluids are separated from each other by an interface, wherein a distribution element is provided in the vessel wherein the method comprises the steps of:

feeding a feed stream comprising a dispersion of the first and second fluid into the vessel of the wash separator wherein the second fluid forms a disperse phase in the form of droplets which is distributed within the first fluid forming a continuous phase, distributing the feed stream via an outlet opening in the distribution element into the second fluid in the vessel, and wherein an element for promoting coalescence is arranged between the outlet opening of the distribution element and the interface and/or the interface is within the element, wherein the element for promoting coalescence is a structured packing, and wherein the distribution element comprises a plurality of outlet openings for forming droplets with an average droplet size of 1 to 25 mm.

2. The method according to claim 1 wherein the feed stream comprises a first feed stream and a second feed stream and further comprising the step of adding second fluid to the first feed stream before the second feed stream leaves the distribution element.

3. The method according to claim 1 wherein the wash separator is operated under a pressure of less than the pressure at the critical point or at ambient pressure.

4. The method according to claim 1 wherein the wash separator is operated under a pressure below ambient pressure or at least at ambient pressure or at a pressure below the pressure at the critical point.

* * * * *